US009555634B2

(12) United States Patent
Matsumoto et al.

(10) Patent No.: US 9,555,634 B2
(45) Date of Patent: Jan. 31, 2017

(54) PRINTING MATERIAL RECEPTACLE, LABEL, AND PRINTING APPARATUS

(71) Applicant: Seiko Epson Corporation, Tokyo (JP)

(72) Inventors: Akihito Matsumoto, Chino (JP); Yoshihiro Koizumi, Shiojiri (JP); Takeshi Iwamuro, Matsumoto (JP); Masaru Takahashi, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 164 days.

(21) Appl. No.: 14/635,966

(22) Filed: Mar. 2, 2015

(65) Prior Publication Data
US 2015/0165778 A1 Jun. 18, 2015

Related U.S. Application Data

(62) Division of application No. 13/659,631, filed on Oct. 24, 2012, now abandoned.

(30) Foreign Application Priority Data

Oct. 28, 2011 (JP) ................................. 2011-237042

(51) Int. Cl.
B41J 2/175 (2006.01)
B41J 2/195 (2006.01)
(Continued)

(52) U.S. Cl.
CPC ........... B41J 2/17503 (2013.01); B41J 2/1755 (2013.01); B41J 2/17546 (2013.01);
(Continued)

(58) Field of Classification Search
CPC ..... B41J 2/04501; B41J 2/135; B41J 2/17503; B41J 2/17546; B41J 2/1755; B41J 2/17553; B41J 2/17566; B41J 2/195; B41J 2/21; B41J 2/4753; B41J 11/00; B41J 29/373; G03G 15/0863; G03G 2215/0697; G03G 2221/1823

See application file for complete search history.

(56) References Cited

U.S. PATENT DOCUMENTS 4,814,320 A 3/1989 Kawai et al.
4,835,291 A 5/1989 Kawai et al.
(Continued)

FOREIGN PATENT DOCUMENTS

GB 1 349 173 3/1974
JP 48-025503 4/1973
(Continued)

Primary Examiner — Anh T. N. Vo

(57) ABSTRACT

A printing material receptacle fitted on a folder of a printing apparatus that includes a writing unit. The printing material receptacle includes a housing to accommodate ink; a first recording portion formed on a face of the housing and for recording updatable first information relating to the printing material receptacle to be updatable and visible using a non-electronic method, the face being exposed from the folder when the printing material receptacle is fitted on the folder; and a second recording portion formed on the face of the housing and for recording updatable second information relating to the printing material receptacle to be updatable, invisible, and mechanically readable using a non-electronic method. The first and second recording portions are configured to be written with the first and second information respectively by the writing unit.

8 Claims, 5 Drawing Sheets

(51) Int. Cl.
    *G03G 15/08*     (2006.01)
    *B41J 2/475*     (2006.01)
    *B41J 2/21*      (2006.01)
    *G01J 3/46*      (2006.01)

(52) U.S. Cl.
    CPC ........... *B41J 2/17566* (2013.01); *B41J 2/195* (2013.01); *B41J 2/21* (2013.01); *B41J 2/4753* (2013.01); *G01J 3/46* (2013.01); *G03G 15/0863* (2013.01); *G03G 2215/0697* (2013.01); *G03G 2221/1823* (2013.01)

(56) References Cited

U.S. PATENT DOCUMENTS

| | | | |
|---|---|---|---|
| 5,218,192 A | 6/1993 | Fuji et al. | |
| 6,213,600 B1 | 4/2001 | Kobayashi et al. | |
| 6,395,681 B1 | 5/2002 | Ikegami et al. | |
| 6,935,716 B2* | 8/2005 | Hatasa | B41J 2/1752 347/19 |
| 7,128,380 B2* | 10/2006 | Hatasa | B41J 2/17513 347/50 |
| 7,819,498 B2* | 10/2010 | McReynolds | B41J 2/17546 347/19 |
| 2002/0021909 A1* | 2/2002 | Harumoto | G03G 15/55 399/27 |
| 2002/0135630 A1* | 9/2002 | Kosugi | B41J 2/17513 347/19 |
| 2003/0019480 A1 | 1/2003 | Landschoff | |
| 2009/0252901 A1* | 10/2009 | Haas | G09F 3/0294 428/29 |
| 2009/0315928 A1 | 12/2009 | Maruyama | |
| 2011/0148092 A1 | 6/2011 | Jarvis et al. | |

FOREIGN PATENT DOCUMENTS

| | | |
|---|---|---|
| JP | 51-065606 | 6/1976 |
| JP | 59-199757 A | 11/1984 |
| JP | 62-243653 A | 10/1987 |
| JP | 04-086975 A | 3/1992 |
| JP | 4-83786 U | 7/1992 |
| JP | 04-189196 A | 7/1992 |
| JP | 06-024140 A | 2/1994 |
| JP | 06-255120 A | 9/1994 |
| JP | 07-172050 A | 7/1995 |
| JP | 08-034946 A | 2/1996 |
| JP | 10-002893 A | 1/1998 |
| JP | 10-100544 A | 4/1998 |
| JP | 2000-218816 A | 8/2000 |
| JP | 2003-011469 A | 1/2003 |
| JP | 2003-316095 A | 11/2003 |
| JP | 2006-327111 A | 12/2006 |
| JP | 2010-018024 A | 1/2010 |
| JP | 2010-031106 A | 2/2010 |
| JP | 2011-056739 A | 3/2011 |

* cited by examiner

MOVEMENT DIRECTION OF INK CARTRIDGE

PRINTING MATERIAL RECEPTACLE, LABEL, AND PRINTING APPARATUS

CROSS-REFERENCE TO RELATED APPLICATIONS

This application is a divisional of, and claims priority under 35 U.S.C. §120 on, U.S. patent application Ser. No. 13/659,631, filed Oct. 24, 2012, which claims priority under 35 U.S.C. §119 on Japanese Application No. 2011-237042, filed Oct. 28, 2011. Each of these applications is hereby incorporated by reference in its entirety.

BACKGROUND

1. Technical Field

The present invention relates to a technology of recording information on a recording material receptacle.

2. Related Art

A technology of installing a semiconductor memory on a printing material receptacle fitted on a printing apparatus has been proposed. The classification of the color of the printing material accommodated in the printing material receptacle and the remaining amount of the printing material, for example, are recorded in the semiconductor memory. By recording the classification of the color of the printing material on the printing material receptacle side, the printing apparatus can determine whether or not the classification of the color of the fitted printing material receptacle is appropriate. Further, by recording the remaining amount of the printing material on the printing material receptacle side, the printing apparatus can appropriately ascertain the remaining ink amount even in a case where the printing material receptacle is temporarily detached from the printing apparatus and fitted once again by the user.

JP-A-6-255120, JP-A-2000-218816, JP-A-2003-11469, JP-A-2010-18024, and JP-A-2011-56739 are examples of the above-described related arts.

However, the structure of a printing material receptacle on which a semiconductor memory is installed is relatively complex. The structure of a printing apparatus on which such a printing material receptacle is fitted is the same. Further, also from the viewpoint of supporting the environment, it is desirable that a substitute technology with a low environmental impact be substituted for the semiconductor memory of the related art. Therefore, there is demand for a printing material receptacle with which information can be recorded with a simple configuration. Further, since information recorded in a semiconductor memory is not visible to a user, a semiconductor memory is not suited to being visible to a user. On the other hand, for example, information relating to the remaining amount of the printing material may be information that the user wishes to acquire. That is, if the information recorded on the printing material receptacle side is configured to be visible to the user, usability for the user is improved. Therefore, there is demand for information recorded on the printing material receptacle side to be visible to the user.

SUMMARY

The invention can be realized in the following forms or application examples.

Application Example 1

According to Application Example 1, there is provided a printing material receptacle configured to be fitted on a folder of a printing apparatus that includes a writing unit. The printing material receptacle includes: a housing to accommodate ink; a first recording portion formed on a face of the housing and for recording updatable first information relating to the printing material receptacle to be updatable and visible using a non-electronic method, the face being exposed from the folder when the printing material receptacle is fitted on the folder; and a second recording portion formed on the face of the housing and for recording updatable second information relating to the printing material receptacle to be updatable, invisible, and mechanically readable using a non-electronic method. The first and second recording portions are written with the first and second information respectively by the writing unit.

Such a printing material receptacle can be used, for example, in combination with a printing apparatus recording information on the first recording portion and the second recording portion. According to the printing material receptacle of Application Example 1, the first information and the second information relating to the printing material receptacle can be recorded by the first recording portion and the second recording portion. Since the first information and the second information are recorded using a non-electronic method, the configuration of the printing material receptacle is relatively simple. Further, the first information is recorded to be visible. Therefore, if the first information is information that can be useful to the user, usability for the user is improved. Further, the second information is recorded to be invisible. Therefore, although not necessarily required for the user, if the second information is information that can be useful to those other than the user, usability for those other than the user is improved. Further, usability for the user is also improved. For example, the first information becoming harder to verify by the user through sight due to excess information can be suppressed.

Application Example 2

In the printing material receptacle according to Application Example 1, the first information is information relating to the remaining amount of a printing material accommodated in the printing material receptacle.

Information relating to the remaining amount of the printing material is useful information to the user. According to the printing material receptacle according to Application Example 2, the effect relating to the first information out of the effects of Application Example 1 is favorably demonstrated.

Application Example 3

In the printing material receptacle according to Application Example 1 or 2, the second information includes at least one of maintenance information relating to the history of maintenance executed in the printing apparatus using the printing material accommodated in the printing material receptacle, error information relating to the history of errors detected in the printing apparatus relating to the printing material receptacle, and detachment information relating to the detachment history of the printing material receptacle.

While the various pieces of information that Application Example 3 specifies are not necessarily required for the user, the information can be useful information to the manufacturers of the printing material receptacle and the printing apparatus, for example. According to the printing material receptacle of Application Example 3, the effect relating to the second information out of the effects of Application Example 1 is favorably demonstrated.

Application Example 4

In the printing material receptacle according to any one of Application Examples 1 to 3, the second recording portion includes: a first layer on which the second information is recorded by a region of a portion of a heat-sensitive material being heated and colors being changed, and on which the second information is updated by a portion of a region where there is no change in colors being heated; and a second layer placed further to the outside than the first layer, absorbing light beams of the wavelength region of at least a portion of visible light, with a property of transmitting near-infrared rays.

According to a printing material receptacle with such a configuration, the second information recorded on the first layer can be recorded by the second layer to be invisible and mechanically readable with a simple configuration.

Application Example 5

In the printing material receptacle according to any one of Application Examples 1 to 4, the first recording portion has the first information recorded by a region of a portion of a heat-sensitive material being heated and colors being changed, and the first information is updated by a portion of a region where there is no change in colors being heated.

According to a printing material receptacle with such a configuration, the first information can be recorded with a simple configuration to be visible. Moreover, by combining the configuration of Application Example 5 with the configuration of Application Example 4, the section recording the first information on the first recording portion and the section recording the second information on the second recording portion can be combined in the printing apparatus.

Application Example 6

According to Application Example 6, there is provided a printing material receptacle according to any one of Application Examples 1 to 5, the second recording portion includes a first layer on which the second information is recorded by a region of a portion of a heat-sensitive material being heated and colors being changed, and on which the second information is updated by a portion of a region where there is no change in colors being heated; and a second layer placed further to an outside than the first layer, absorbing light beams of a wavelength region of at least a portion of visible light, with a property of transmitting near-infrared rays. The first recording portion has the first information recorded by a region of a portion of a heat-sensitive material being heated and colors being changed, and the first information is updated by a portion of a region where there is no change in colors being heated.

Application Example 7

According to Application Example 7, the first recording portion and the second recording portion are arranged along a scanning direction of the printing apparatus.

According to such a printing material receptacle, the printing apparatus to which the printing material receptacle is fitted can be configured so that there is only one direction of relative displacement between the writing unit and the printing material receptacle.

Application Example 8

According to Application Example 8, there is provided a printing apparatus on which a printing material receptacle can be fitted where the first recording portion and the second recording portion are arranged in the printing material receptacle with a positional relationship of being lined up along one direction, the printing apparatus including: a first recording portion for recording updatable first information relating to the printing material receptacle to be updatable and visible using a non-electronic method; a second recording portion for recording updatable second information relating to the printing material receptacle to be updatable, invisible, and mechanically readable using a non-electronic method; a fitting unit fitting a printing material receptacle; and a writing unit performing writing of the first information into the first recording portion and writing of the second information into the second recording portion in a state in which the printing material receptacle is fitted on the fitting unit, wherein the writing unit performs writing of the first information into the first recording portion and writing of the second information into the second recording portion by the writing unit and the printing material receptacle fitted on the printing apparatus being relatively displaced in one direction.

A printing apparatus with such a configuration demonstrates the same effects as the printing material receptacles previously described. The printing apparatus may be used in combination with the printing material receptacles of Application Examples 1 to 7.

Further, other than the forms described above, aspects of the invention can also be realized in the form of a method of recording information on a printing material receptacle, a program of the printing apparatus, a storage medium on which the program is recorded to be readable by a computer, or the like.

BRIEF DESCRIPTION OF THE DRAWINGS

The invention will be described with reference to the accompanying drawings, wherein like numbers reference like elements.

DESCRIPTION OF EXEMPLARY EMBODIMENTS

A. Example

Figure 1:
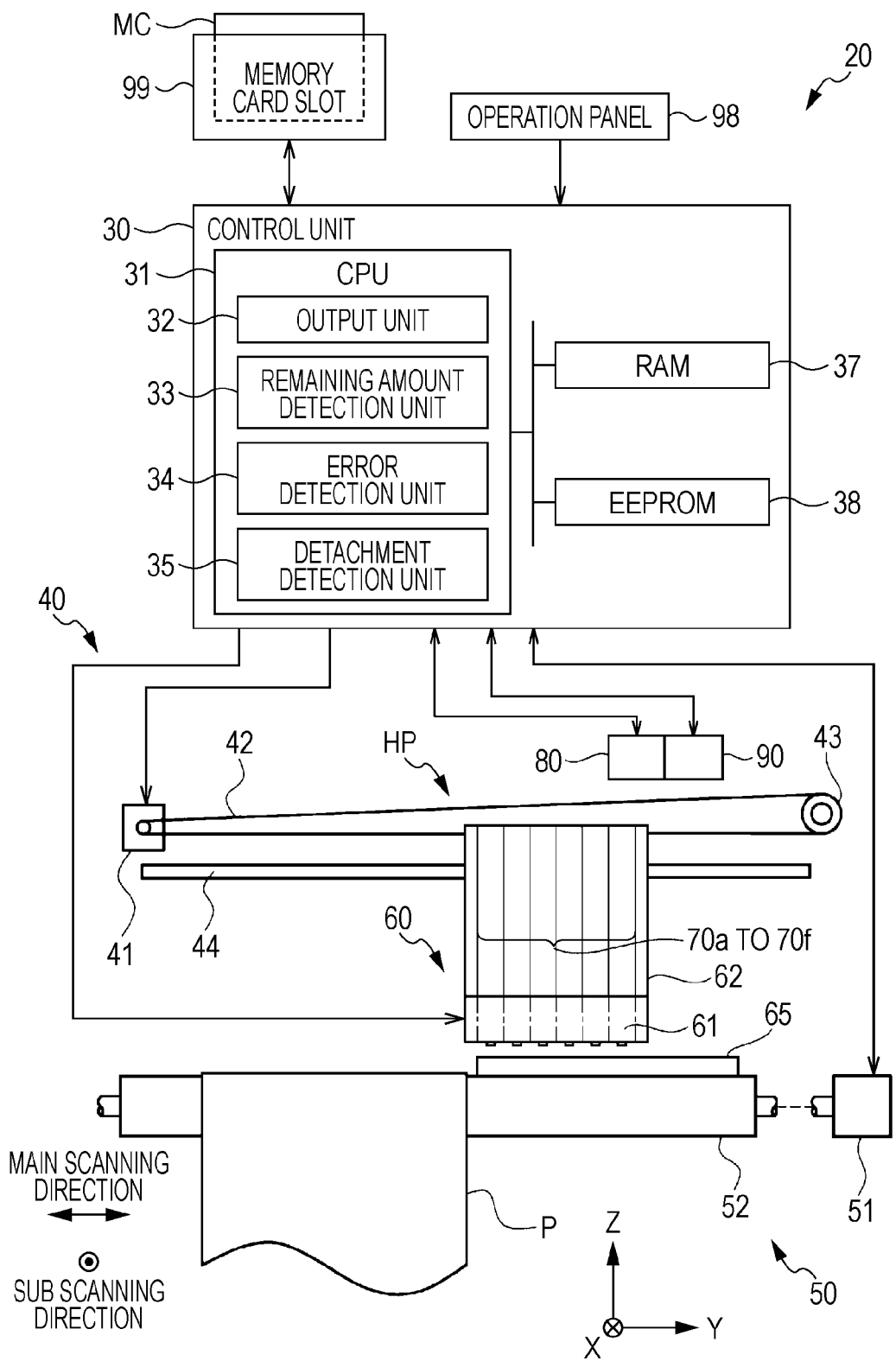
FIG. 1 is an explanatory view illustrating an outline configuration of a printing apparatus.

FIG. 1 illustrates an outline configuration of a printer 20 as an example of a printing apparatus of an aspect of the invention. The printer 20 includes a control unit 30, a printing head unit transport mechanism 40, a paper transport mechanism 50, a printing head unit 60, a maintenance unit 65, a reading unit 80, a writing unit 90, an operation panel 98, and a memory card slot 99.

The control unit 30 includes a CPU 31, a RAM 37, and an EEPROM 38. The control unit 30 controls the overall operation of the printer 20. The CPU 31 also functions as an output unit 32, a remaining amount detection unit 33, an error detection unit 34, and a detachment detection unit 35 by deploying and executing a program stored in the EEPROM 38 as a non-volatile storage medium in the RAM 37 as a volatile storage medium. Details of each of the functional units will be described later.

The printing head unit transport mechanism 40 includes a motor 41, a driving belt 42, a pulley 43, and a shaft 44. The shaft 44 is provided to be parallel with the axis of a platen 52 described later. The shaft 44 retains the printing head unit 60 to be slidable. The printing head unit transport mechanism 40 causes the printing head unit 60 to reciprocate along the shaft 44, that is, the axis direction of the platen 52, by driving the motor 41. The reciprocating direction of the printing head unit 60 is also referred to as a main scanning direction.

The paper transport mechanism 50 includes a motor and the platen 52. The paper transport mechanism 50 transports a printing medium P by driving the motor 51. The printing medium P is transported in a direction orthogonal to the main scanning direction. The direction in which the printing P is transported at a position on the platen 52 opposing a printing head 61 is also referred to as a sub scanning direction.

The printing head unit 60 includes the printing head 61 and a folder 62. An ink cartridge as a printing material receptacle is fitted to the folder 62. Ink as a printing material is accommodated in the ink cartridge. The folder 62 is configured so that the ink cartridge is detachable. In the present example, the ink cartridge is fitted on the folder 62 from above in the gravitational direction. Further, in the present example, six ink cartridges 70a to 70f are fitted on the folder 62. Inks with different characteristics to one another are accommodated in the ink cartridges 70a to 70f. In the present example, the ink cartridges 70a to 70f respectively accommodate cyan ink, magenta ink, yellow ink, black ink, light cyan ink, and light magenta ink. The number of ink cartridges that can be fitted on the folder 62 may be one or more. Further, a plurality of ink cartridges in which inks with the same characteristics are accommodated may be fitted on the folder 62. In the following description, the ink cartridges 70a to 70f are also collectively referred to as an ink cartridge 70. Further, in a case where the constituent elements of the ink cartridges 70a to 70f are collectively referred to, the ink cartridges 70a to 70f will be referred to using the reference symbol without the letters "a" to "f".

Nozzle rows corresponding to the inks of each color described above are formed on the lower portion (platen 52 side) of the printing head 61. When the ink cartridges 70a to 70f are fitted on the folder 62, the supply of ink from the ink cartridges 70a to 70f to the printing head 61 becomes possible. The printing head 61 receives the supply of ink from the ink cartridges 70a to 70f and discharges the ink onto the printing medium P.

The maintenance unit 65 is a mechanism performing maintenance operations using the ink accommodated in the ink cartridge 70. The maintenance unit 65 is provided at a position away from the position at which the printing medium P is placed. In the present example, the maintenance unit 65 is configured to be able to execute flushing and cleaning as maintenance operations. Flushing is an operation of discharging ink in order to prevent drying of the ink discharge openings of the printing head 61. The ink is discharged toward an ink collection box that the maintenance unit 65 includes. Cleaning is an operation of resolving discharge failure occurring in the nozzles that the printing head 61 includes, that is, clogging of the nozzles. The maintenance unit 65 includes a head cap and a suction pump. In the cleaning, clogging of the nozzles is resolved by fitting the head cap to the lower face (face on which the nozzles are formed) of the printing head 61 in a state in which the printing head unit 60 is moved to the position of the head cap and suctioning the inside of the head cap using the suction pump. A predetermined amount of ink is consumed through the cleaning.

The timing of executing the flushing and the cleaning can be set as appropriate. In the present example, flushing is executed when power is turned on to the printer 20. Further, in a case where a predetermined amount of printing is consecutively performed, flushing is executed every time the printing head unit 60 reciprocates a predetermined number of times. Further, in the present example, cleaning is executed based on a manual operation by the user. For example, in a case where a cleaning execution instruction is received via the operation panel 98, the control unit 30 executes cleaning.

The maintenance operations that the maintenance unit 65 executes are not limited to the examples described above, and may have various configurations. For example, the maintenance unit 65 may include a mechanism detecting clogging of the nozzles. Various known techniques can be adopted as such a mechanism. For example, the maintenance unit 65 may detect clogging of the nozzles electrically. With such a system, an electrode member opposing a nozzle substrate on the lower face of the printing head 61 is prepared. When a direct current voltage is applied between the electrode member and the nozzle substrate with the electrode member as the positive electrode and the nozzle substrate as the negative electrode, an electric field is generated between the two members. When ink is discharged from the nozzles toward the electrode member side in such a state, the ink is negatively charged by the nozzle substrate as soon as the ink is discharged. As the discharged and negatively charged ink approaches the electrode member, since a positive charge increases at the electrode member through electrostatic induction, the electrostatic capacitance between the electrode member and the nozzle substrate increases. In a case where an induction current generated by the electrostatic induction as the ink is discharged through the operation described above cannot be detected, the control unit 30 determines that clogging of the nozzles has occurred. Here, the control unit 30 may also execute cleaning automatically in a case where clogging of the nozzles is detected.

The reading unit 80 reads the information recorded on the ink cartridges 70a to 70f. The writing unit 90 writes information into the ink cartridges 70a to 70f. In the present example, the reading unit 80 and the writing unit 90 are placed in the upper region of the printing head unit 60 in the gravitational direction. Further, the reading unit 80 and the writing unit 90 are placed to be fixed at predetermined positions. Details of the reading unit 80 and the writing unit 90 will be described later.

The operation panel 98 is an UI (User Interface) receiving instructions of the operations of the printer 20 which the user inputs. In the present example, the operation panel 98 is a display. The operation panel 98 receives instructions of operations through a GUI (Graphical User Interface) displayed on the display. The memory card slot 99 is an interface to which a memory card as a storage medium is connectable. The memory card slot 99 receives the input of data of the printing target from the memory card. Here, the printer 20 may also receive data of the printing target data from outside the printer 20. For example, the printer 20 may also receive printing data from a personal computer connected to the printer 20.

According to such a printer 20, the control unit 30 causes the printing head unit 60 to reciprocate in the main scanning direction through the printing head unit transport mechanism 40, and transports the printing medium P in the sub scanning direction through the paper transport mechanism to match the reciprocating movement. Further, the control unit 30 executes printing by driving the nozzles at required timings to match the movements of the printing head unit transport mechanism 40 and the paper transport mechanism 50 and forming ink dots of colors based on the input printing data.

According to such a printer 20, in a state in which a printing process has not been executed, that is, in a state in which the printing head unit transport mechanism 40 is stopped, the printing head unit 60 stops at a position determined in advance. Such a position is also referred to as a home position HP. In the present example, the home position HP is determined to be a position in the main scanning direction away from the position where the printing medium P is placed. In FIG. 1, a state in which the printing head unit 60 is stopped at the home position HP is illustrated. Further, the reading unit 80 and the writing unit 90 are placed to be lined up in the main scanning direction in the order of the printing medium P, the home position HP of the printing head unit 60, the reading unit 80, and the writing unit 90. That is, the reading unit 80 and the writing unit 90 are placed on the opposite side to the printing medium P seen from the home position HP.

However, without being limited to the example described above, the home position HP can be set to an arbitrary position in the main scanning direction. Similarly, the positions of the reading unit 80 and the writing unit 90 can be set to arbitrary positions in the main scanning direction. The printer 20 may be configured so that the position of the printing head unit 60 when the ink cartridges 70a to 70f are detached does not overlap the positions of the reading unit 80 and the writing unit 90 in the main scanning direction.

In the present application, the direction opposite the sub scanning direction is also referred to as the X direction of an XYZ orthogonal coordinate system. The direction from the placement position of the printing medium P toward the home position HP in the main scanning direction is also referred to as the Y direction. The direction from below to above in the gravitational direction is also referred to as the Z direction.

Figure 2:
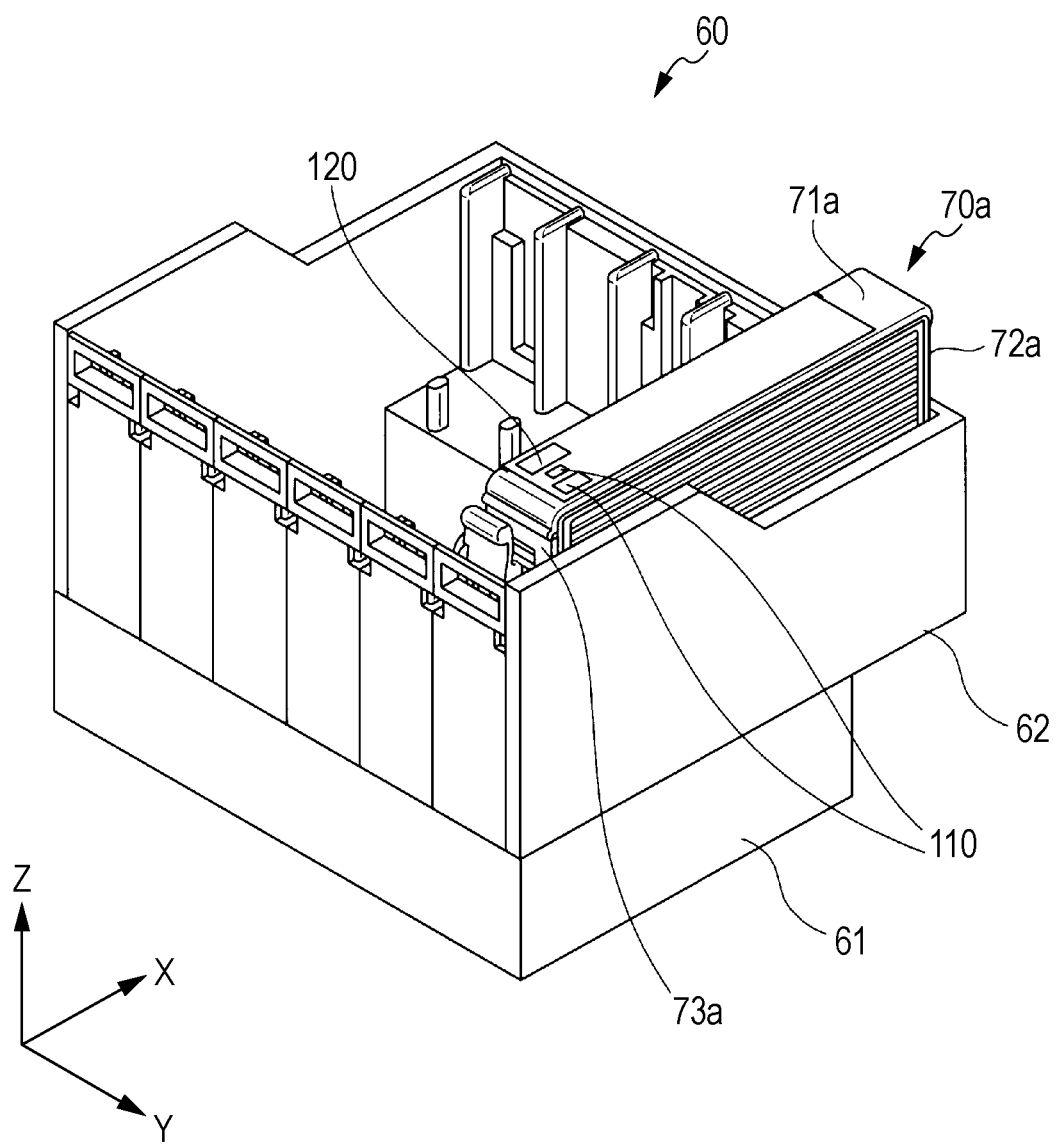
FIG. 2 is a perspective view illustrating a state in which an ink cartridge is fitted to a printing head unit.

FIG. 2 illustrates a state in which the ink cartridge 70a is fitted on the printing head unit 60. In the present example, the housing of the ink cartridge 70a has the shape of a hexahedron. The −Z direction of the folder 62 is integral with the printing head 61. In the present example, the printing head unit 60 is fitted on the printer 20 so that the user can see the printing head unit from the four directions of −X, Y, −Y, and Z of the folder 62. The Z direction of the folder 62 is open. The ink cartridge 70a is fitted on the folder 62 from the opening toward the −Z direction. That is, in the fitting state on the folder 62, the ink cartridge 70a is in a state in which an upper face 71a of the housing of the ink cartridge 70a is completely exposed from the folder 62. At this time, a side face 72a of the housing of the ink cartridge 70a in the X direction is in a state in which a portion is exposed from the folder 62. A side face 73a of the housing of the ink cartridge 70a in the −X direction is in a state of being approximately covered by the folder 62. Here, the ink cartridges 70b to 70f are fitted on the folder 62 lined up in the Y direction in a similar manner to the ink cartridge 70a.

A first recording portion 110 and a second recording portion 120 are formed on the upper face 71a of the ink cartridge 70a. In the present example, the first recording portion 110 and the second recording portion 120 are configured as labels LA on which predetermined printing has been performed. The labels LA are adhered to the upper face 71a using an adhesive. The adhering of the labels LA is performed at a stage before the ink cartridge 70a is shipped. The labels LA are also adhered to the ink cartridges 70b to 70f in a similar manner to the ink cartridge 70a. In the present example, a label LA is one label on which the first recording portion 110 and the second recording portion 120 are printed. Through such a configuration, when adhering the label LA on the upper face 71a, there is no need to position the relative positional relationship of the first recording portion 110 and the second recording portion 120. However, the first recording portion 110 and the second recording portion 120 may be printed distributed into a plurality of labels.

Figure 3:
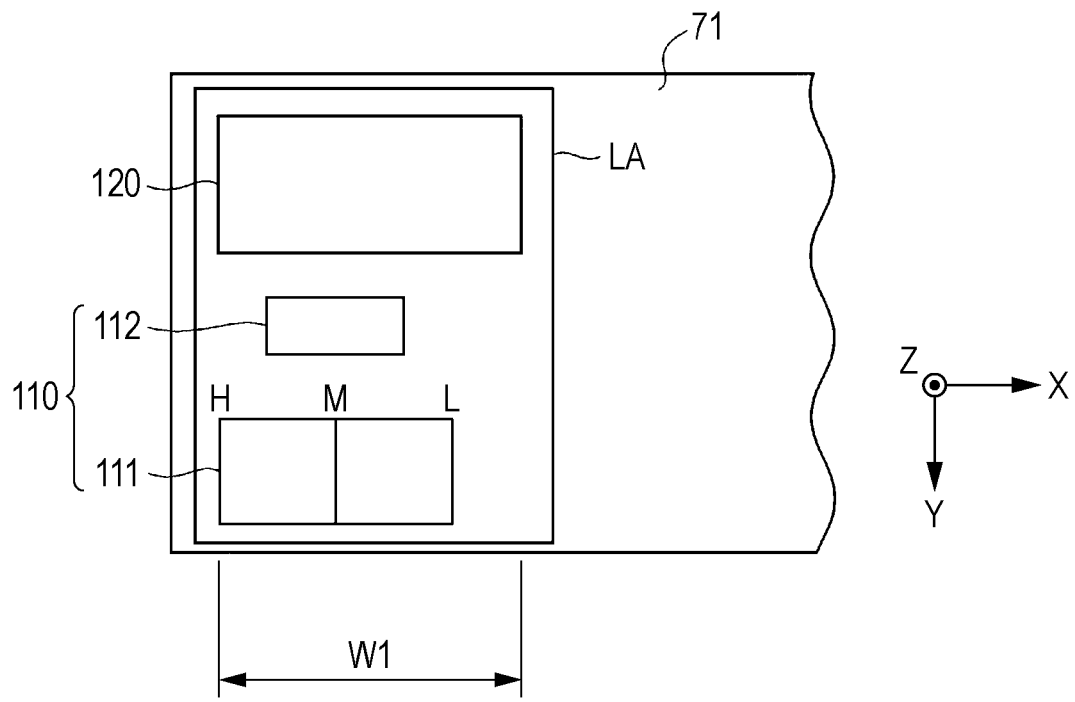
FIG. 3 is an explanatory view illustrating a label adhered to an ink cartridge.

FIG. 3 illustrates details of the first recording portion 110 and the second recording portion 120. The first recording portion 110 and the second recording portion 120 are placed lined up in order of the second recording portion 120 and the first recording portion 110 toward the Y direction. The Y direction in the present example is the direction in which the ink cartridge 70 is arranged.

Figure 4:
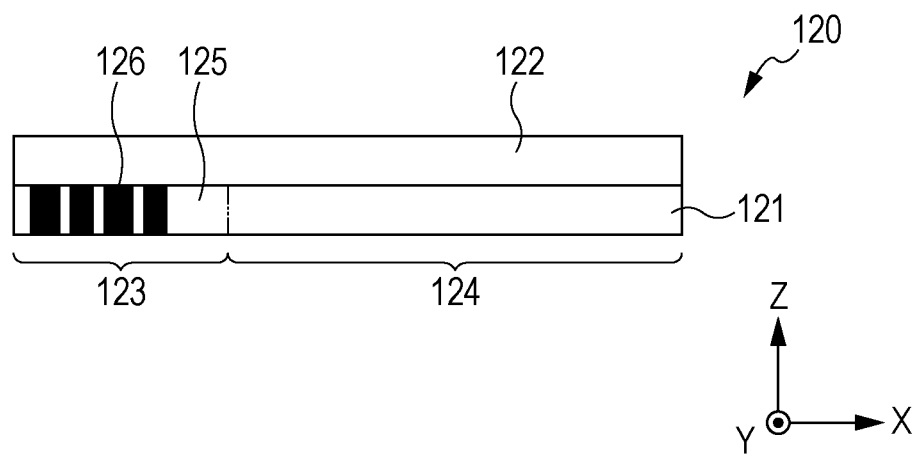
FIG. 4 is an explanatory view illustrating the cross-sectional configuration of a second recording portion during initial use.

FIG. 4 illustrates the cross-sectional configuration of the second recording portion 120. In FIG. 4, the cross-sectional configuration seen from the −Y direction of the second recording portion 120 during the initial use of the ink cartridge 70, that is, the first time that the ink cartridge 70 is used. The second recording portion 120 is a region for recording updatable information (hereinafter also referred to as update information) relating to the ink cartridge 70 to be updatable, invisible, and optically readable using a non-electronic method. The update information recorded on the second recording portion 120 is information relating to the ink cartridge 70 including the second recording portion 120. In the present example, the second recording portion 120 includes a recording layer 121 and a masking layer 122. That is, the second recording portion 120 has a two-layered structure of the recording layer 121 and the masking layer 122. The recording unit 121 is formed on the ink cartridge 70 side. The masking layer 122 is formed on the outside of the ink cartridge 70 (recording layer 121). Here, the second recording portion 120 is not limited to a two-layered structure. For example, the second recording portion 120 may include an adhesive layer for adhering the upper face 71a to the opposite side to the masking layer 122.

The recording layer 121 is a layer recording the update information. In the present example, identification information is recorded on the recording layer 121 in addition to the update information. The identification information is information for identifying the ink cartridge including the second recording portion 120. The recording layer 121 includes an identification information recording unit 123 and an update information recording unit 124. The identification information recording unit 123 is a region for recording the identification information out of the entire region of the recording layer 121. The update information recording unit 124 is a region for recording the update information out of the entire region of the recording unit 121. The identification information recording unit 123 and the update information recording unit 124 are assigned to predetermined ranges of the recording layer 121 in advance. The identification information is recorded on the identification information recording unit 123 in advance by the stage of the ink cartridge 70 being shipped. The information recorded on the update information recording unit 124 is updated according to the usage status of the ink cartridge 70 at the usage stage of the ink cartridge 70 by the printer 20.

In the present example, the identification information and the update information are recorded on the recording layer 121 as a pattern. The pattern is a pattern expressed according to regulations determined in advance. The pattern can be read mechanically based on the regulations. A one-dimensional code or a two-dimensional code, for example, may be adopted as the pattern. Examples of such codes include the common barcode and the QR code (registered trademark).

The recording unit 121 of the present example has a property of changing colors by being heated to a predetermined or greater temperature. In other words, the recording layer 121 has a property in which the rate of absorption of light changes by being heated. The change in the rate of absorption occurs irreversibly. Light of the wavelength region of at least a portion of infrared rays is included in the light for which the rate of absorption changes. In the present example, the rate of absorption of light in the recording layer 121 is irreversibly increased by being heated. The pattern expressing the identification information described above is formed irreversibly in the recording layer 121 by the recording layer 121 being heated. In the present example, in a case where the recording layer 121 is observed with the human eye, the recording layer 121 presents as white before being heated and presents as black after being heated. The recording layer 121 illustrated in FIG. 4 includes a first region 125 which has not been heated and a second region 126 which has been heated and changed in colors. The second region 126 configures the pattern expressing the information recorded on the recording layer 121. Here, instead of the second region 126, the first region 125 may configure the pattern expressing the information recorded on the recording layer 121. Further, the change in the color of the recording layer 121 through being heated may not necessarily be irreversible.

The recording layer 121 with such a property can be formed using a known heat-sensitive color former. In the present example, the recording layer 121 is formed by printing a heat-sensitive color former on a base material (here, the material of the label LA). Various common methods, for example, an offset printing method, a gravure printing method, a screen printing method, or a flexographic printing method can be used as the printing method. The base material is not particularly limited, and for example, paper such as art coated paper and high quality paper, a polyester resin sheet, a vinyl chloride sheet, or the like can be used.

Various common heat-sensitive color formers can be used as the heat-sensitive color former. For example, the heat-sensitive color formers described in JP-A-59-199757, JP-A-62-243653, JP-A-6-24140, JP-A-7-172050, and JP-A-10-100544 may be used as the heat-sensitive color former. For example, a fluorene compound including a heat-sensitive color former is described in JP-A-59-199757. A dibiel compound including a heat-sensitive color former is described in JP-A-62-243653.

The masking layer 122 is a layer for hiding the information recorded on the recording layer 121. In the preset example, the masking layer 122 has a property of making the information recorded on the recording layer 121, that is, the pattern, invisible. In the present application, invisible denotes not being directly visible to the human eye. Directly visible denotes being visible without using a special apparatus. Invisible denotes not being visible. Specifically, the masking layer 122 has a property of absorbing the light beams of at least a portion of the wavelength region of visible light beams and transmitting near infrared rays. Visible light beams can be generally defined as an electromagnetic wave of a wavelength region of 380 to 780 nm. Near infrared rays are electromagnetic waves with a wavelength region with a longer wavelength than visible red light beams and a shorter wavelength than far infrared rays. Near infrared rays can be generally defined as electromagnetic waves with wavelength regions of 780 nm to 2.5 μm. Such a masking layer 122 can be formed on the recording layer 121 by printing using a printing material with the properties of the masking layer 122 described above. Similarly to the formation of the recording layer 121, various common methods can be used as the printing method. In the present example, the masking layer 122 is visible as black to the human eye regardless of the pattern expressed on the recording layer 121.

Various common printing materials can be used as the printing material with the properties of the masking layer 122. For example, the inks described in JP-A-8-34946 and JP-A-2010-31106 can be used as the printing material. An ink with bismuth sulfide fine particles as the principal component of the color material is described in JP-A-8-34946. More specifically, an ultraviolet curable ink formed of a prepolymer, a monomer, a photopolymerization initiator, an adjuvant, and the like, and an oxidative polymerization ink formed of a phenolic resin, an alkyd resin, linseed oil, a dryer, and the like are described. An ink using a perylene pigment is described in JP-A-2010-31106. While a perylene pigment covers the wavelengths of the visible light region at both molecule-specific absorption bands and absorption bands caused by intermolecular interaction and transmits light of a portion of the wavelengths of visible light, the perylene pigment appears black to the human eye.

Since the second recording portion 120 includes the masking layer 122 in such a manner, the user cannot see the information recorded on the second recording portion 120, or more specifically, the recording layer 121. Details of the information recorded on the recording layer 121 will be described later.

Here, description is returned to FIG. 3. The first recording portion 110 is a region for recording update information to be updatably and visibly readable using a non-electronic method. The update information recorded on the first recording portion 110 is information relating to the ink cartridge 70 including the first recording portion 110. In the present example, information relating to the remaining amount of ink accommodated in the ink cartridge 70 is recorded in the first recording portion 110. In the present example, the first recording portion 110 includes a remaining ink amount display unit 111 and a used display unit 112.

The remaining ink amount display unit 111 is a region for recording the remaining amount of ink accommodated in the ink cartridge 70 in a plurality of stages. The remaining ink amount is detected as a process of the remaining amount detection unit 33 of the control unit 30. In the present example, the folder 62 has a capacitor structure configured by two plate-like electrodes arranged to be parallel to interpose the ink cartridge 70. The electrostatic capacitance of the capacitor corresponding to each ink cartridge 70 interposed between the electrodes changes according to the ink consumption. The control unit detects the remaining ink amount by measuring the electrostatic capacitance of the capacitor. The remaining ink amount can be found using a function of the electrostatic capacitance, a map associating the electrostatic capacitance with the remaining ink amount, and the like. Such a remaining ink amount detection system is described in JP-A-2006-327111.

The method of ascertaining the remaining ink amount is not limited to the method of the present example, and various common methods can be used. For example, the control unit 30 may estimate the remaining ink amount by counting the ink discharge amounts. Here, while the ink cartridge 70 and the control unit 30 are not electrically connected in the present example, in a case where the ink cartridge 70 includes a terminal that can electrically connect to the control unit 30 and the ink cartridge 70 is electrically connected to the control unit 30 via the terminal, it is also possible to detect the remaining ink amount on the ink cartridge 70 side. For example, in a case where the ink cartridge 70 accommodates conductive ink, the ink cartridge 70 may include a pair of electrodes within the ink receptacle chamber. When the ink between the electrodes is consumed, since electricity no longer passes between the electrodes, the control unit 30 can detect ink consumption via the terminal described above. If a pair of electrodes is provided on the liquid surface level of the ink over stages, the remaining ink amount can be detected over stages.

In the present example, a heat-sensitive color former is used in the recording of the remaining ink amount display unit 111. Specifically, printed matter printed over the whole of a white base material (here, the material of the label LA) using a printing material including a heat-sensitive color former is used as the remaining ink amount display unit 111. That is, recording on the remaining ink amount display unit 111 is performed by being heated and changing colors. Similarly to the base material of the second recording portion 120, various printing media can be used as the base material. In the present example, the change in the color of the heat-sensitive color former in a case where the heat-sensitive color former is heated is irreversible. The same type as that used for the recording layer 121 may be used as the heat-sensitive color former. The change in colors on the remaining ink amount display unit 111 may not be irreversible.

The used display unit 112 is a region for displaying the fact that the remaining amount of the ink accommodated in the ink cartridge 70 has reached a usage limit (hereinafter also referred to as an ink end) determined in advance. In the present example, a heat-sensitive color former is used in the recording on the used display unit 112. Specifically, printed matter in which characters to be displayed are printed on a white base material (here, the material of the label LA) using a printing material including a heat-sensitive color former is used as the used display unit 112. Here, instead of in the region on which characters are to be formed, the printing material may also be printed only in a region other than the region on which characters are to be formed. Alternatively, the printing material may be printed over the entire region as a whole. The same materials as for the remaining ink amount display unit 111 may be used as the base material and the heat-sensitive color former.

Writing into such a first recording portion 110 and the update information recording unit 124 of the second recording portion 120 is performed using the writing unit 90.

Further, in the present example, information recorded on the first recording portion 110 and the second recording portion 120 (the identification information recording unit 123 and the update information recording unit 124) can be read by the reading unit 80. The writing operation by the writing unit 90 and the reading operation by the reading unit 80 will be described later.

Here, details of the information recorded on the second recording portion 120 described above will be described. In the present example, the identification information recorded on the recording layer 121, more specifically, on the identification information recording unit 123, of the second recording portion 120, includes information relating to the characteristics of the ink. In the present example, the identification information includes a manufacturing lot number, the type of ink (here, the classification of the color and the model number of the ink), information relating to the expiration period of the ink, and information showing that the ink is a genuine product which is compatible with the printer 20. Since ink deteriorates over the course of time, it is desirable that ink be used within a predetermined period from the manufacturing date. Information relating to the expiration period of the ink is therefore included in the identification information. In the present example, information relating to the expiration period of the ink is the manufacturing date of the ink. Information representing the predetermined period described above may be included in the information relating to the expiration period of the ink. Here, the content of the identification information is not limited to the examples described above, and may be set as appropriate. For example, the identification information may include at least one piece of information described above.

The identification information recorded on the identification information recording unit 123 is read by the reading unit 80 (details described later) and used in a verification process executed by the control unit 30. The verification process is used in a determination of whether or not the ink cartridge 70 is in a desirable state for the printer 20 based on the identification information. The specification is also included in the "state". Examples of desirable specification types include the characteristics of the ink accommodated in the ink cartridge and the shape of the cartridge. An "undesirable state" includes the ink cartridge 70 being undesirable from the start. Further, an "undesirable state" also includes an ink cartridge 70 that was originally desirable but which is no longer desirable. For example, an ink cartridge 70 for which the expiration period has been exceeded and an ink cartridge 70 refilled with ink which is incompatible with the printer 20 apply to the latter.

In the verification process, it is determined whether each of the specific items of the identification information satisfy conditions registered in the printer 20 in advance. The conditions registered in advance are, for example, that the manufacturing lot number is a value within a predetermined range, that the classification of the color of the ink is a color which is a color corresponding to the fitting position of the ink cartridge 70, that the model number of the ink is a predetermined value, that a predetermined amount of time has not passed since the manufacturing date, and the like. The verification is successful in a case where the registered conditions are satisfied for all of the specific items of the identification information. On the other hand, the verification is unsuccessful in a case where at least one of the specific items of the identification information does not satisfy the registered conditions. A failed verification implies that the ink cartridge 70 fitted on the folder 62 is in an undesirable state for the printer 20.

In a case where verification is unsuccessful through a verification process, the control unit 30 performs a notification process as a process of the output unit 32. The notification process is a process outputting information to notify the user. The content of the notification can be, for example, that the ink cartridge 70 is in an undesirable state for the printer 20, that verification has been unsuccessful, or the like. As the form of output, in the present example, a notification message is output to be displayable on the operation panel 98. However, the form of the output can take on various forms. For example, an image representing the notification message may be printed by the printer 20. Alternatively, in a case where the printer 20 is connected to a personal computer, the notification message may be output to be displayable on a display that the personal computer includes. If a notification process is performed in such a manner, in a case where the ink cartridge 70 fitted on the printer 20 by the user is in an undesirable state for the printer 20, the user can be notified of that fact. As a result, if the user fits an ink cartridge 70 in a desirable state on the printer 20, a decrease in the printing quality and the generation of errors in the printer 20 can be suppressed.

The update information recorded on the recording layer 121, more specifically, the update information recording unit 124, of the second recording portion 120, is information determined in advance to be recorded to be invisible to the user out of the updatable information relating to the ink cartridge 70. In the present example, the update information recorded on the update information recording unit 124 includes the maintenance information, the error information, and the detachment information. The maintenance information is information relating to the history of maintenance executed in the printer 20 on which the ink cartridge 70 is fitted using the ink accommodated in the ink cartridge 70. The error information is information relating to the history of errors detected in the printer 20 relating to the ink cartridge 70. The detachment information is information relating to the history of at least one of the ink cartridge 70 being fitted on the printer 20 and the ink cartridge 70 being detached from the printer 20, that is, the detachment history of the ink cartridge 70.

In the present example, the maintenance information includes the number of times that cleaning has been performed using the maintenance unit 65. Further, the maintenance information includes the amount of ink consumed by the flushing performed using the maintenance unit 65. The ink consumption amount can be found, for example, by multiplying the number of times that flushing has been performed with the ink discharge amount per flush. The ink discharge amount per flush may be determined in advance to be a certain amount. Alternatively, the ink discharge amount may be found through calculation for each flush by the control unit 30 from the number of ink discharges. The maintenance information is recorded by the control unit 30 in the RAM 37 or the EEPROM 38 when the corresponding events take place.

In the present example, the error information includes the presence of errors and the number of errors relating to the remaining ink amount. Errors relating to the remaining ink amount are detected as a process of the error detection unit 34 of the control unit 30. Specifically, errors relating to the remaining ink amount are detected in the printer 20 as follows.

The control unit 30 detects the remaining ink amount in the ink cartridge 70 at a predetermined timing through the method described above. Next, the control unit reads the information recorded on the remaining ink amount display unit 111, that is, the display shown on the remaining ink amount display unit 111, using the reading unit 80. Next, the control unit 30 checks the consistency between the detection result of the remaining ink amount and the ink consumption stage represented by the read result from the remaining ink amount display unit 111. An inconsistency between the two, that is, a contradiction, indicates that the user has refilled the ink cartridge 70 with ink. Here, there is a possibility of the refilled ink being an undesirable specification for the printer 20. Therefore, the control unit 30 detects the inconsistency between the two as an error relating to the remaining ink amount. The number of errors detected in such a manner is recorded in the RAM 37 or the EEPROM 38 by the control unit 30. Here, in a case where an error is detected, the control unit 30 may notify the user in a similar manner to the notification process described above.

While the predetermined timing of detecting the remaining ink amount can be set as appropriate in such an error detection operation, it is desirable that the predetermined timing be a timing when it is estimated that there is a possibility of the remaining ink amount changing. In the present example, the following three timings are set as the predetermined timing.

(1) First timing: when power is turned on for the printer 20

(2) Second timing: when one of the ink cartridges 70*a* to 70*f* is newly fitted (3) Third timing: when the printing amount by the printer 20 reaches a predetermined number At the first and third timings, the first display process is executed consecutively for all of the ink cartridges 70. At the second timing, detection of the remaining ink amount is performed only for the newly fitted ink cartridge 70. The second timing can detect the ink cartridge 70 being accommodated in the folder 62, for example, using a sensor detecting physically or optically. An example of such a sensor is a photo-interrupter. Here, in a case where the ink cartridge 70 includes a terminal for electrically connecting with the control unit 30, the second timing may be detected electrically. That is, the control unit 30 may detect that the control unit 30 and the ink cartridge 70 are electrically connected via the terminal. The third timing may be determined by the control unit 30 using an index value with a correlation with the printing amount. The index value may be the number of printed sheets, for example, or the ink discharge amount calculated from the number of ink discharges and the dot size.

In the present example, the detachment information includes the number of times that the ink cartridge 70 is fitted on the printer 20 and the number of times that the ink cartridge 70 is detached from the printer 20. Detection of the detachment of the ink cartridge 70 is executed as a process of the detachment detection unit 35 of the control unit 30. The specific detection method is as described for the detection method of the second timing described above. The number of detachments detected in such a manner is recorded in the RAM 37 or the EEPROM 38 by the control unit 30.

Further, in the present example, the update information recorded in the update information recording unit 124 includes the number of printed sheets printed by the printer 20 using the ink cartridge 70. The update information recorded in the update information recording unit 124 is read and used when the ink cartridge 70 or the printer 20 and the ink cartridge 70 are collected by the manufacturer. For example, the maintenance information, the number printed sheets, and the like can be used by the manufacturer to consider ways of improving the quality of the ink cartridge 70 and the printer 20. Further, the error information, the detachment information, the number of printed sheets, and the like can be used to determine whether or not a repair is within the warranty coverage when a malfunction of the printer 20 or the ink cartridge 70 occurs and the manufacturer collects the malfunctioning item for repairs. As is clear from the description above, the update information recorded in the update information recording unit 124 can also be seen as history information relating to the performance of the printer 20 and the ink cartridge 70. Alternatively, the update information recorded in the update information recording unit 124 can be seen as warranty decision information for the printer 20 or the ink cartridge 70.

The items of the update information recorded in the update information recording unit 124 are not limited to the examples described above, and can be set as appropriate. For example, the update information may be any one or two of the maintenance information, the error information, and the detachment information. Alternatively, the update information may include information recorded on the remaining ink amount display unit 111 or the used display unit 112. Alternatively, the error information may include the number of failed verifications based on the identification information.

Figure 5:
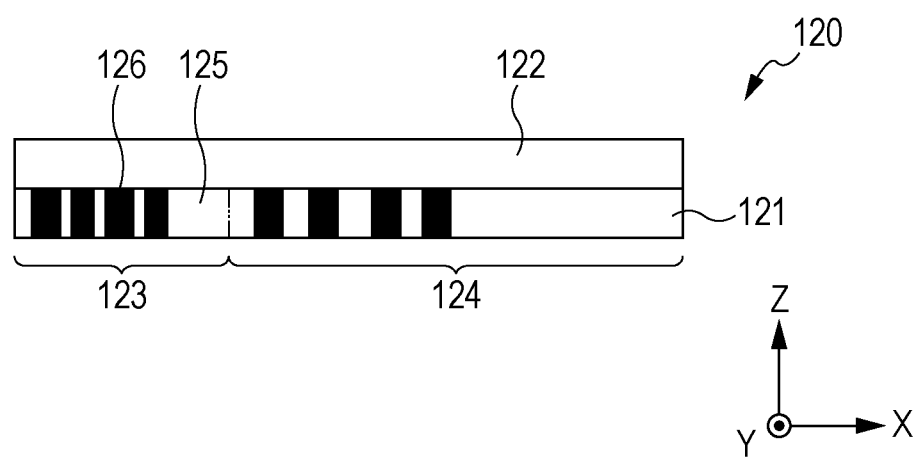
FIG. 5 is an explanatory view illustrating the cross-sectional configuration of the second recording portion after an update information recording unit is updated.

FIG. 5 illustrates the cross-sectional configuration of the second recording portion 120 after the update information recording unit 124 is updated. As illustrated in the drawing, the identification information recording unit 123 has not changed from the state illustrated in FIG. 4. On the other hand, a portion of the update information recording unit 124 is heated by the writing unit 90, and a portion of the region which was the first region 125 in FIG. 4 is changed to black, and the second region 126 is formed.

In the present example, the update information recording unit 124 has respectively dedicated recording regions assigned for each item of the update information described above. Updating of each item is performed by heating the corresponding regions. Further, in the present example, since the update information recording unit 124 changes colors irreversibly by being heated, the item relating to the number out of each item of the update information is recorded to increment the number. In the present example, as illustrated in FIG. 5, the number to be incremented is recorded by a one-dimensional code represented by the second region 126 every time that the update information recording unit 124 is updated. The number to be incremented is not limited to once, and may be twice or more. For example, in a case where the number of times to be incremented is recorded twice, and the values thereof are 2 and 4, the total number is taken as six times. That is, the control unit 30 may count the increase in the number, and may record a pattern corresponding to the value of the increased number, for example, a one-dimensional code, in the update information recording unit 124. However, the second region 126 may also be recorded in the update information recording unit 124 as the width of the second region 126 increases in proportion with the number.

Figure 6:
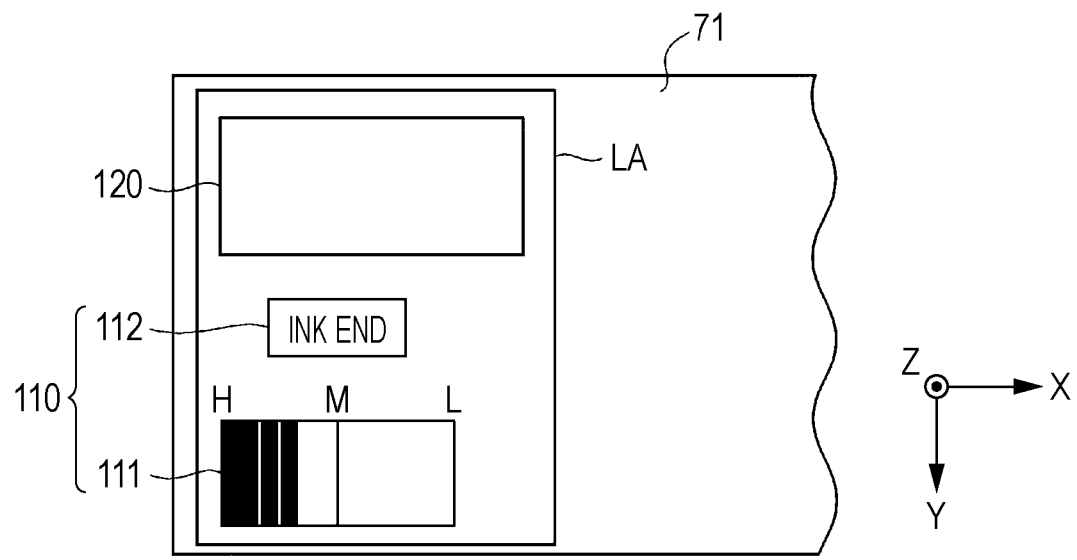
FIG. 6 is an explanatory view illustrating changes in the display state of a label adhered to an ink cartridge.

FIG. 6 illustrates a change in the display states of the first recording portion 110 and the second recording portion 120. In FIG. 6, the remaining ink amount display unit 111 is indicating a display state recorded in a case where approximately one third of the ink in the ink cartridge 70 has been consumed. The display of the remaining ink amount display unit 111 changes from white to black in stages from an H level toward an L level according to the decrease amount of the remaining ink amount. Such a change occurs by heating the region to be changed to black using the writing unit 90. The number of stages may be set arbitrarily. In the present example, the display of the remaining ink amount display unit 111 is displayed so that a slightly white region is positioned between a plurality of black regions that have changed from white to black at different timings. That is, when the remaining ink amount decreases and regions according to the decrease amount are newly heated, new heating is performed from a position away from regions that have changed colors to black by being heated earlier by a predetermined distance. According to such a configuration, the user can verify the ink consumption history afterward, improving usability.

In FIG. 6, the used display unit 112 is indicating a state in which the display state has changed by the ink cartridge 70 being heated by the writing unit 90 as the ink end has been reached. "ink end" is displayed to be visible on the used display unit 112 as character information indicating that the ink end has been reached. Such character information is recorded, that is, displayed, by a region printed using a printing material including a heat-sensitive color former changing colors to black through heating. In a case where such a display is performed, in the present example, the whole of the used display unit 112 is heated. Therefore, the control to heat only the region in which the characters are to be formed is unnecessary, and the control load of the control unit 30 is decreased.

In a case where printing is performed in advance on the used display unit 112 using the printing material on only a region other than the region on which the characters are to be formed, white characters on a black background are displayed on the used display unit 112. Further, in a case where printing is performed using the printing material over the entire region of the used display unit 112, a control to heat only the region in which the characters are to be formed or only a region other than the region on which the characters are to be formed may be performed. Here, the content of the characters to be displayed on the used display unit 112 may be set arbitrarily.

In FIG. 6, the second recording portion 120 is indicating a display state of after the update information recording unit 124 has been updated from the state illustrated in FIG. 4 to the state illustrated in FIG. 5. As described above, the second recording portion 120 includes the masking layer 122 on the surface. Therefore, even if the information recorded in the update information recording unit 124 is updated, as illustrated in FIG. 6, the change is not visible.

Figure 7:
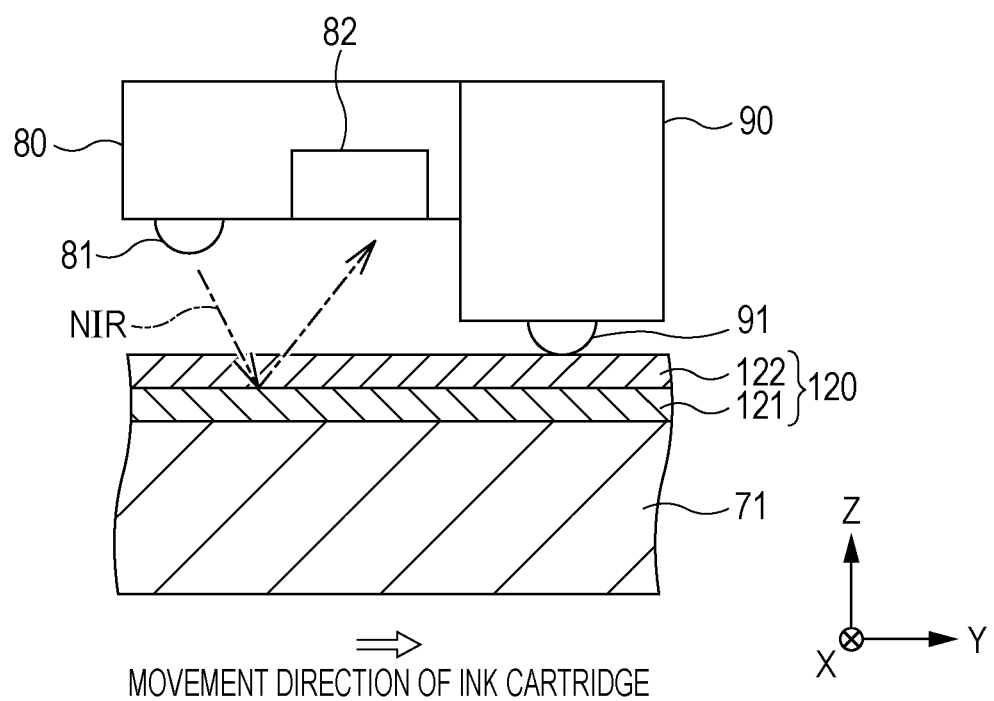
FIG. 7 is an explanatory view illustrating the methods of reading information recorded on the second recording portion and recording information.

FIG. 7 illustrates the outline configurations of the reading unit 80 and the writing unit 90. In the present example, the reading unit 80 is provided further to the home position HP side of the printing head unit 60 than the writing unit 90. The reading unit 80 reads the information recorded in the first recording portion 110, that is, the display recorded in the first recording portion 110. Further, the reading unit 80 reads the information recorded in the second recording portion 120. In the present example, the reading unit 80 is configured to be able to read both the identification information recording unit 123 and the update information recording unit 124 of the second recording portion 120. The identification information recording unit 123 is read in order to perform the verification process described above. In the present example, the update information recording unit 124 is to receive an instruction that the user inputs and to display the information recorded in the update information recording unit 124 on the operation panel 98. According to such a configuration, the demands of the user can be satisfied in a case where the user wishes to confirm the information recorded in the update information recording unit 124, improving usability for the user. However, such a configuration may not be adopted. That is, the update information recording unit 124 may not be configured to be readable by the reading unit 80. Further, in a case where a verification process is not performed, the identification information recording unit 123 may not be configured to be readable by the reading unit 80. In such a case, the second recording portion 120 may not include the identification information recording unit 123. The reading operation of the first recording portion 110 and the second recording portion 120 is performed using an optical technique.

As illustrated in FIG. 7, the reading unit 80 includes an irradiation unit 81 and a light receiving unit 82. The irradiation unit 81 and the light receiving unit 82 are provided on the end face of the reading unit 80 in the −Z direction. The end face in the −Z direction is the face opposing the ink cartridge 70 in a case where the ink cartridge 70 is moved to directly below (−Z direction) of the reading unit 80 by the printing head unit transport mechanism 40. The irradiation unit 81 has an infrared LED built therein. The irradiation unit 81 irradiates near-infrared rays NIR toward the reading target of the ink cartridge 70. In FIG. 7, a state in which the irradiation unit 81 irradiates the near-infrared rays NIR toward the second recording portion 120 is illustrated. The near-infrared rays NIR transmit through the masking layer 122, and an amount of near-infrared rays NIR according to the reflectivity of the recording layer 121 is reflected by the recording layer 121.

The light receiving unit 82 includes a light receiving element and receives the reflected near-infrared rays NIR. In the present example, a CCD (Charge Coupled Device) camera is used as the light receiving element. Here, the light receiving element may be any element that can convert the received near-infrared rays into an electrical signal. For example, the light receiving element may be a CMOS (Complementary Metal Oxide Semiconductor) camera. The reading unit 80 receives light through the light receiving unit 82, encodes the converted electrical signal through a built-in circuit (not shown), and outputs the encoded signal to the control unit 30. Since the reflectivities are different for the first region 125 and the second region 126 configuring the recording layer 121, the information recorded in the recording layer 121 can be read from the encoded result. Encoding may also be performed by the control unit 30. The positional relationship between the irradiation unit 81 and the light receiving unit 82, and the directivity of the irradiation unit 81 are set so that the irradiated light from the irradiation unit 81 is reflected by the recording layer 121 and received appropriately by the light receiving unit 82. While the first recording portion 110 does not include a masking layer, the reading unit 80 can read the first recording portion 110 through the same technique as the reading of the second recording portion 120.

The reading operations of the first recording portion 110 and the second recording portion 120 by the reading unit 80 are performed by relatively displacing the reading unit 80 and the ink cartridge 70. In the present example, the ink cartridge 70 out of the reading unit 80 and the ink cartridge 70 is configured to move. Specifically, the control unit 30 moves the printing head unit 60 on which the ink cartridge 70 is fitted from the home position HP along the main scanning direction (Y direction) using the printing head unit transport mechanism 40, and reads the information at each reading position using the irradiation unit 81 and the light receiving unit 82. Such a movement of the printing head unit 60 is realized by an operation mode (hereinafter also referred to as a reading operation mode) different from that during printing. That is, in the reading operation mode, the control unit 30 moves the printing head unit 60 at a scanning speed suited to the reading. The reading operation mode may also set different movement speeds for when reading is being performed and when reading is not being performed (during a simple movement to the reading position). When reading is not being performed, the speed may be higher than when reading is being performed.

In the present example, the reading unit 80 and the ink cartridge 70 are relatively displaced with respect to one direction (main scanning direction). Therefore, the reading unit 80 is configured to be able to read the entire range in which the first recording portion 110 and the second recording portion 120 are arranged (the width W1 of FIG. 3). That is, the light receiving unit 82 is provided across a width equal to or greater than the width W1 in a direction (X direction and −X direction) orthogonal to the direction in which the printing head unit 60 is relatively displaced with respect to the reading unit 80. In the present example, as illustrated in FIG. 3, the first recording portion 110 and the second recording portion 120 are arranged so that the width in the X and −X directions overlaps the Y direction as much as possible. Therefore, in the present example, the width W1 is the width of the second recording portion 120 with the greatest width in the X and −X directions out of the remaining ink amount display unit 111, the used display unit 112, and the second recording portion 120. With such an arrangement, the reading range of the reading unit 80 can be decreased compared to a case where such an arrangement is not adopted. That is, the reading unit 80 can be miniaturized, and as a result, costs can be lowered.

In a case where the reading unit 80 is configured not to perform reading of the update information recording unit 124, the light receiving unit 82 may be provided across a width in the X and −X directions to be able to read the entirety of the first recording portion 110 and the identification information recording unit 123. In the present example, the identification information recording unit 123 is arranged within a range of the greatest width out of the remaining ink amount display unit 111 and the used display unit 112 in the X and −X directions. Therefore, in a case where a configuration of the reading unit 80 not performing reading of the update information recording unit 124 is adopted, the reading range of the reading unit 80 can be suppressed. That is, the reading unit 80 can be miniaturized, and as a result, costs can be lowered.

The writing unit 90 includes a heating unit 91. A plurality of heating units 91 are arranged in a direction (X and −X directions) orthogonal to the direction in which the printing head unit 60 is relatively displaced with respect to the reading unit 80. The arrangement range of the heating units 91 is a width of equal to or greater than the width W1. The heating units 91 include an electrode and a heating resistor, and the heating resistor is heated by being electrically connected to the electrode. The plurality of heating units 91 can control the ON and OFF of the heating individually for each heating unit 91. The heating units 91 change the color of the contact portion of a heat-sensitive medium by being heated in a state of being in contact with a heat-sensitive medium. A thermal head used in a heat-sensitive printer or a thermal transfer printer may be used as such a writing unit 90.

The writing unit 90 records information into the recording layer 121 by heating required portions of the second recording portion 120 using the heating units 91. In FIG. 7, a state of recording information in a region of a portion of the recording layer 121 through heating is illustrated. Similarly, the writing unit 90 records information into the first recording portion 110 in the state described above by heating the first recording portion 110.

Such writing operations into the first recording portion 110 and the second recording portion 120 are performed while relatively displacing the writing unit 90 and the ink cartridge 70. In the present example, out of the writing unit 90 and the ink cartridge 70, the ink cartridge 70 is configured to move. Specifically, the control unit 30 heats desired portions by individually controlling the heating of the plurality of heating units 91 while moving the printing head unit 60 on which the ink cartridge 70 is fitted from the home position HP along the main scanning direction (Y direction), using the printing head unit transport mechanism 40. Such a movement of the printing head unit 60 is realized by an operation mode (hereinafter also referred to as a writing operation mode) different from that during printing and the reading operation mode. That is, in the writing operation mode, the control unit 30 moves the printing head unit 60 at a scanning speed suited to the writing. The writing operation mode may also set different movement speeds for when writing is being performed and when writing is not being performed (during a simple movement to the writing position). When writing is not being performed, the speed may be higher than when writing is being performed.

In the present example, whether or not to write to the remaining ink amount display unit 111 is determined when the remaining ink amount is detected. Specifically, the control unit 30 stores the remaining ink amount (or electrostatic capacitance) corresponding to each stage displayed on the remaining ink amount display unit 111. Further, the control unit 30 stores the remaining ink amount of the last time that writing to the remaining ink amount display unit 111 was performed. When the remaining ink amount is detected, the control unit 30 refers to the detected remaining ink amount and the remaining ink amount of the last time that writing to the remaining ink amount display unit 111 was performed, and in a case where the stages to which the two remaining ink amount belong are different stages, the control unit 30 determines that an update of the remaining ink amount display unit 111, that is, new writing, is necessary. If an update of the remaining ink amount display unit 111 is necessary as a result of the determination, the control unit 30 performs writing to the remaining ink amount display unit 111 using the writing unit to change colors until the stage corresponds to the detected remaining ink amount.

The control unit 30 may omit the determination of whether or not writing to the remaining ink amount display unit 111 is to be performed and may always execute writing to the remaining ink amount display unit 111 when the remaining ink amount is detected. In so doing, even if the ink cartridge 70 has already been exchanged before a detection process of the remaining ink amount is executed, accurate information can be displayed on the remaining ink amount display unit 111. Here, in a case where the ink cartridge 70 has not been exchanged and there is no need for an update of the remaining ink amount display unit 111, a region which has already been heated and changed colors is reheated. In such a case, there is no change in the display of the remaining ink amount display unit 111.

In the present example, whether or not writing to the used display unit 112 is to be performed is determined when the remaining ink amount is detected. In a case where the ink end is detected, the control unit 30 performs writing to the used display unit 112. The ink end is not limited to a state in which there is no ink left in the ink cartridge 70 at all. The ink end may be set as appropriate as a remaining ink amount with a possibility of no ink being left at all when printing is executed in a case where printing is executed the next time. In the present example, the last stage of the plurality of stages of the display of the remaining ink amount display unit 111 equates to the ink end.

In the present example, whether or not writing to the update information recording unit 124 is to be performed is determined when the printer 20 receives an instruction to turn off the power of the printer 20. The control unit 30 stores the update status of each item of the update information to be recorded into the update information recording unit 124 from when the determination of whether or not writing to the update information recording unit 124 is to be performed was last made to when the determination is made this time. Furthermore, in a case where at least an item has been updated, writing to the update information recording unit 124 is performed for the updated item. That is, the control unit 30 stores the update status of the update information to be recorded in the update information recording unit 124 during a period determined in advance, and after the period has elapsed, the control unit 30 summarizes and writes the update information corresponding to events that have occurred during the period into the update information recording unit 124. The period may be determined to be a fixed interval, or may be determined to be a period until a predetermined event occurs at an arbitrary timing. According to such a configuration, the limited region of the update information recording unit 124 on which information is irreversibly recorded can be used effectively compared to a case where each item of the update information relating to the number is recorded on the update information recording unit 124 by being incremented by the number "once". Such an effect can also be obtained by making the frequency of an update determination of the update information recording unit 124 lower than the frequency of the update determination of the first recording portion 110. Specifically, the limited region of the update information recording unit 124 can be effectively used in the recording to the number of error included in the error information.

In the printer 20 described above, the first recording portion 110 (the remaining ink amount display unit 111 and the used display unit 112) corresponds to the first recording portion of an aspect of the invention. The second recording portion 120 corresponds to the second recording portion of an aspect of the invention. The recording layer 121 corresponds to the first layer of an aspect of the invention. The masking layer 122 corresponds to the second layer of an aspect of the invention. The writing unit 90 corresponds to the writing unit of an aspect of the invention. The folder 62 corresponds to the fitting unit of an aspect of the invention.

According to the printer 20 and the ink cartridge 70 described above, various pieces of information relating to the ink cartridge 70 can be recorded by the first recording portion 110 and the second recording portion 120. Since such information is recorded in a state in which a heat-sensitive material changes colors by being heated, a storage medium using an electric method, for example, a semiconductor memory, is not necessary. As a result, the configurations of the ink cartridge 70 and the printer 20 can be relatively simplified. Moreover, since a metallic material is not necessary, the impact on the environment can be suppressed. Information that can be useful to the user such as information relating to the remaining ink amount is recorded in the first recording portion 110 to be visible. Usability for the user is therefore improved. Information not necessarily needed for the user but useful to those other than the user, for example, the manufacturer of the printer 20 or the ink cartridge 70, is recorded to be invisible in the second recording portion 120. Usability for those other than the user is therefore improved. Further, usability for the user is also improved. The user being unable to easily see information useful to the user due to many pieces of useful information and unuseful information being mixed and recorded, for example, can be suppressed. Alternatively, even in a case where the recorded information cannot be read, there may be cases where the user wishes to ascertain what the information is. According to the configuration of the present example, by making the second recording portion 120 invisible, the user being confused by unnecessary information can be suppressed.

Further, according to the ink cartridge 70, by configuring the second recording portion 120 to include the recording layer 121 and the masking layer 122, it is possible to record into the second recording portion 120 to be invisible and mechanically readable with a simple configuration. Further, since the first recording portion 110 can perform reading and writing through the same method as the recording layer 121, the reading unit 80 and the writing unit 90 of the printer 20 can be used commonly between the first recording portion 110 and the second recording portion 120. The configuration of the printer 20 can therefore be simplified.

Further, according to the ink cartridge 70, the first recording portion 110 and the second recording portion 120 are arranged lined up in one direction. The one direction is a direction along the direction in which the writing unit 90 and the ink cartridge 70 are relatively displaced in a state in which the ink cartridge 70 is fitted on the printer 20. Further, in a case where a plurality of ink cartridges 70 are fitted, the one direction is the direction in which the plurality of ink cartridges 70 are arranged. Therefore, even with a configuration in which the writing unit 90 and the ink cartridge 70 are relatively displaced in only one direction, the printer 20 can favorably perform writing of information into the first recording portion 110 and the second recording portion 120.

B. Modification Examples

B-1. Modification Example 1

Recording of the update information into the remaining ink amount display unit 111 may also take a form of recording character information. In such a case, characters corresponding to the characters to be displayed may be printed on the remaining ink amount display unit 111 in advance using a heat-sensitive color former. Further, display, that is, recording, on the used display unit 112 is not limited to recording using character information. For example, a configuration of simply causing a color change in the used display unit 112 in a case where an ink end is detected may be adopted. In such a case, character information for describing the region in which a change in color occurs may be attached to the used display unit 112 in a state in which a color change does not occur by being heated. As described above, recording into the first recording portion 110 can be performed using character information, patterns, and colors.

Further, recording of the update information into the first recording portion 110 is not limited to a configuration of being performed by heating a heating material. Recording of the update information into the first recording portion 110 may be any configuration of recording to be updatable and visible using a non-electronic method. A non-electronic method may be a method based on changes in the characteristics of the material, a method of printing, a method of changing the shape, or the like. The method of the example described above is included in methods based on changes in the characteristics of the material. As a method other than the example described above, for example, recording into the first recording portion 110 may be recording using a printing material. In such a case, the writing unit 90 may be a stamp unit. Alternatively, in a case where a configuration in which the relative displacement of the ink cartridge 70 and the writing unit 90 can be performed independently from the printing head 61 is adopted, the printing head 61 may be used as the writing unit 90. Alternatively, recording into the first recording portion 110 may be performed by changing the shape of the first recording portion 110. For example, a punch hole may be formed in the first recording portion 110. In such a case, the writing unit 90 may be a punch hole formation unit. Alternatively, recording into the first recording portion 110 may be performed by causing a color change using moisture. A material that changes colors by containing a predetermined amount of moisture is described in JP-A-10-2893, for example. Wetness sensing printing matter in which waterless planographic ink containing a water-soluble dye is printed on a paper that does not easily repel water is described in JP-A-10-2893. In a case where such a material is used, the writing unit 90 may be a unit spraying liquids including water. The section for writing to the first recording portion 110 and the section for writing to the second recording portion 120 may be different.

B-2. Modification Example 2

Recording into the second recording portion 120 is not limited to a configuration of performing recording by heating a heat-sensitive material. Recording of information into the second recording portion 120 may be any configuration of being able to record information to be updatable, invisible, and mechanically readable using a non-electronic method. A non-electronic method may be a method based on changes in the characteristics of the material, a method of printing, a method of changing the shape, or the like. The method of the example described above is included in methods based on changes in the characteristics of the material. Further, as a method based on changes in the characteristics of the material, for example, recording into the second recording portion 120 may be performed using a magnetic method. In such a case, a common method used in railway tickets, for example, or the like can be used. That is, the second recording portion 120 may also be configured as a magnetic recording layer. A magnetic recording layer is described, for example, in JP-A-48-25503, JP-A-51-65606, and the like. In such a case, the reading unit 80 may be a magnetic reading unit. Further, the writing unit 90 may be a magnetic writing unit.

B-3. Modification Example 3

Without being limited to information relating to the remaining ink amount, the update information recorded in the first recording portion 110 may be any information relating to the ink cartridge 70. For example, the update information may relate to the usage degree of the ink cartridge 70. The "usage degree" may also be taken as the "consumption degree". The first information may be taken as information that can be updated based on the use history of the ink cartridge 70. For example, the update information recorded in the first recording portion 110 may be information relating to the expiration period of the ink. The expiration period of the ink is set from the viewpoint of the quality guarantee of the ink. Information recorded in the identification information recording unit 123 can be used as the manufacturing date of the ink. For example, the remaining time until the end of the expiration period of the ink or the amount of time elapsed from the manufacturing date of the ink to the end of the expiration period may be recorded in stages on the remaining ink amount display unit 111. That the end of the expiration period of the ink has been reached may also be recorded on the used display unit 112.

B-4. Modification Example 4

At least a portion of the first recording portion 110 and the second recording portion 120 is not limited to being formed by adhering a label LA on the housing of the ink cartridge 70. At least a portion of the units may be printed directly onto the housing of the ink cartridge 70. In such a case, there may be no base material for the at least a portion of the units. For example, printing may be performed directly onto the housing of the ink cartridge 70 using a printing material including a heat-sensitive color former.

B-5. Modification Example 5

In the example described above, a so-called on-carriage type in which the ink cartridge 70 scans in the main scanning direction with the printing head 61 is shown as the printer 20. However, the printer 20 may also be a so-called off-carriage type in which the ink cartridge 70 does not scan with the printing head 61. With an off-carriage type, the folder 62 on which the ink cartridge 70 is fitted is provided at a separate location from the printing head 61. The printing head 61 receives the supply of ink from the ink cartridge 70 fitted on the folder 62 via piping such as a tube.

B-6. Modification Example 6

While the example described above had a configuration of the writing unit 90 performing writing to the first recording portion 110 and the second recording portion 120 by the ink cartridge 70 out of the writing unit 90 and the ink cartridge 70 moving, there may also be a configuration of the writing unit 90 moving instead of the ink cartridge 70. Alternatively, writing may be performed by both the writing unit 90 and the ink cartridge 70 moving. Such points can be similarly applied to the relative displacement of the reading unit 80 and the ink cartridge 70. Further, such points can be applied to both the on-carriage type and the off-carriage type.

Further, the direction of the relative displacement of the reading unit 80 or the writing unit 90 and the ink cartridge 70 is not limited to one direction (one-dimensional direction). The direction of the relative displacement may also be a two-dimensional direction. For example, the direction of the relative displacement may be a first direction and a second direction orthogonal to the first direction. Alternatively, the direction of the relative displacement may be a three-dimensional direction.

Further, the reading by the reading unit 80 is not limited to a configuration of being performed while the reading unit 80 and the ink cartridge 70 are relatively displaced. The reading unit 80 may be configured to be able to read the first recording portion 110 and the second recording portion 120 of each ink cartridge 70 regardless of the relative displacement. In such a case, reading may be performed regardless of the relative displacement after the reading unit 80 and the ink cartridge 70 are arranged at positions determined in advance by moving at least one of the reading unit 80 and the ink cartridge 70. The positions determined in advance may be positions away from the position where the printing medium P is placed in the main scanning direction. Alternatively, in a case where an off-carriage system is adopted, the reading unit 80 and the ink cartridge 70 may be fixed not to be relatively displaceable. Such points can be applied similarly to writing to the first recording portion 110 and the second recording portion 120 by the writing unit 90.

B-7. Modification Example 7

The arrangement of the first recording portion 110 and the second recording portion 120 is not limited to the example described above, and the first recording portion 110 and the second recording portion 120 may be arranged at arbitrary positions on the upper face 71. Further, the arrangement of the plurality of ink cartridges 70 when a plurality of ink cartridges 70 are fitted on the printer 20 may be set arbitrarily. For example, while a configuration of arranging the plurality of ink cartridges 70 in the transverse direction (Y, −Y direction) of the housings of the ink cartridges 70 is illustrated in FIG. 2, the plurality of ink cartridges 70 may be arranged in the longitudinal direction (X, −X direction) of the housings of the ink cartridges 70. In such a case, for example, the first recording portion 110 and the second recording portion 120 may be arranged in a line along the X direction. In such a case, if the X direction is the direction of the relative displacement of the writing unit 90 and the ink cartridge 70, even if the writing unit 90 and the ink cartridges 70 are configured to be able to be relatively displaced in only one direction, writing to the first recording portion 110 and the second recording portion 120 can be performed, and the effects described above gained thereby are demonstrated.

Further, the first recording portion 110 and the second recording portion 120 are not limited to being arranged on the upper face 71, and may be arranged on an arbitrary face as long as there is no interference with the functions of the printer 20. For example, in FIG. 2, the first recording portion 110 and the second recording portion 120 may be arranged on the region exposed from the folder 62 out of the side face 72a. It is desirable that the first recording portion 110 be arranged at a location that can be seen in a state in which the ink cartridge 70 is fitted on the printer 20. In so doing, the user can see the update information recorded in the first recording portion 110 without having the ink cartridge 70 detached from the folder 62. For example, in FIG. 2, in a case where the −X direction of the folder 62 is released, the first recording portion 110 and the second recording portion 120 may be arranged on the side face 73a. Further, the first recording portion 110 and the second recording portion 120 may not necessarily be arranged on the same face of the ink cartridge 70, and may be arranged to be readable and writable distributed over a plurality of faces.

As can be seen from the description above, the arrangement of the first recording portion 110 and the second recording portion 120 can be set as appropriate according to the arrangement method of a plurality of ink cartridges 70, whether or not there is relative displacement between the reading unit 80 and the writing unit 90 and the ink cartridges 70, the direction of the relative displacement, and the like.

B-8. Modification Example 8

While a state in which information is recorded on the ink cartridge 70 has been exemplified in the example described above, the example described above can be applied to various printing parts that are degraded through the printing operation or over time. For example, the example described above may be applied to a printing head. In such a case, the usage degree of the printing head 61 may be displayed on the remaining ink amount display unit 111 instead of the remaining ink amount. The usage degree may be, for example, the number of passes (main scans) by the printing head 61, the number of printed sheets, the number of ink discharges, or the like. Further, information showing that the printing head 61 has reached a usage limit may be recorded (displayed) on the used display unit 112.

B-9. Modification Example 9

Without being limited to a serial printer discharging ink while the printing head unit 60 moves, the printer 20 may be a variety of printers. For example, the printer 20 may be a line printer discharging ink from a fixed printing head. Further, without being limited to an ink jet printer, the printer 20 may be a variety of printing apparatuses performing printing using various fluids. For example, the printer 20 may be a laser printer.

While embodiments of the invention have been described above, aspects of the invention are not limited to the examples and configurations described above, and various configurations without departing from the gist of the invention can be adopted. For example, the constituent elements of each application example described above and the elements within the embodiments may be combined, omitted, and prioritized as appropriate to be able to solve at least a portion of the problem of the present application or to demonstrate at least a portion of each effect described above. Further, aspects of the invention of the present application include various modifications and equivalent configurations. Furthermore, while the various elements of the disclosed aspects of the invention have been disclosed with a variety of combinations and configurations, the elements are examples, and there may be more of each element, there may be fewer, or there may be one element. Such aspects are included in the scope of the invention of the present application.

For example, the ink cartridge 70 described above may include only the remaining ink amount display unit 111 out of the remaining ink amount display unit 111 and the used display unit 112. Alternatively, the printer 20 may not include the reading unit 80.

What is claimed is:

1. A printing material receptacle configured to be fitted on a folder of a printing apparatus that includes a writing unit, the printing material receptacle comprising:
   a housing configured to accommodate ink;
   a first recording portion formed on a face of the housing and for recording updatable first information relating to the printing material receptacle to be updatable and visible using a non-electronic method, the face being configured to be exposed from the folder when the printing material receptacle is fitted on the folder, the first recording portion being configured to be written with the first information by the writing unit; and
   a second recording portion formed on the face of the housing and for recording updatable second information relating to the printing material receptacle to be updatable, invisible, and mechanically readable using a non-electronic method, the second recording portion being configured to be written with the second information.

2. The printing material receptacle according to claim 1, wherein the first information is information relating to a remaining amount of a printing material accommodated in the printing material receptacle.

3. The printing material receptacle according to claim 1, wherein the second information includes at least one of maintenance information relating to a history of maintenance executed in the printing apparatus using the printing material accommodated in the printing material receptacle, error information relating to a history of errors detected in the printing apparatus relating to the printing material receptacle, and detachment information relating to a detachment history of the printing material receptacle.

4. The printing material receptacle according to claim 1, wherein the second recording portion includes:
   a first layer on which the second information is recorded by a region of a portion of a heat-sensitive material being heated and colors being changed, and on which the second information is updated by a portion of a region where there is no change in colors being heated; and
   a second layer placed further to an outside than the first layer, absorbing light beams of a wavelength region of at least a portion of visible light, with a property of transmitting near-infrared rays.

5. The printing material receptacle according to claim 1, wherein the first recording portion has the first information recorded by a region of a portion of a heat-sensitive material being heated and colors being changed, and the first information is updated by a portion of a region where there is no change in colors being heated.

6. The printing material receptacle according to claim 1, wherein the second recording portion includes:
   a first layer on which the second information is recorded by a region of a portion of a heat-sensitive material being heated and colors being changed, and on which the second information is updated by a portion of a region where there is no change in colors being heated; and
   a second layer placed further to an outside than the first layer, absorbing light beams of a wavelength region of at least a portion of visible light, with a property of transmitting near-infrared rays,
   wherein the first recording portion has the first information recorded by a region of a portion of a heat-sensitive material being heated and colors being changed, and the first information is updated by a portion of a region where there is no change in colors being heated.

7. The printing material receptacle according to claim 1, wherein the first recording portion and the second recording portion are arranged along a scanning direction of the printing apparatus.

8. A printing apparatus, comprising:
   a folder;
   a writing unit; and
   a printing material receptacle fitted on the folder, the printing material receptacle including:
      a housing configured to accommodate ink;
a first recording portion formed on a face of the housing and for recording updatable first information relating to the printing material receptacle to be updatable and visible using a non-electronic method, the face being configured to be exposed from the folder when the printing material receptacle is fitted on the folder, the first recording portion being configured to be written with the first information by the writing unit; and a second recording portion formed on the face of the housing and for recording updatable second information relating to the printing material receptacle to be updatable, invisible, and mechanically readable using a non-electronic method, the second recording portion being configured to be written with the second information.

* * * * *